(12) United States Patent
Yamada et al.

(10) Patent No.: US 11,129,053 B2
(45) Date of Patent: Sep. 21, 2021

(54) COMMUNICATION SYSTEM, COMMUNICATION CONTROL APPARATUS, COMMUNICATION CONTROL METHOD, AND COMMUNICATION PROGRAM

(71) Applicant: NEC CORPORATION, Tokyo (JP)

(72) Inventors: Toru Yamada, Tokyo (JP); Kyoji Hirata, Tokyo (JP); Akira Kamei, Tokyo (JP); Masahiro Serizawa, Tokyo (JP); Hotaka Sugano, Tokyo (JP); Satoshi Hasegawa, Tokyo (JP); Masashi Shimoma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 45 days.

(21) Appl. No.: 15/746,472

(22) PCT Filed: Jul. 28, 2016

(86) PCT No.: PCT/JP2016/072236
§ 371 (c)(1),
(2) Date: Jan. 22, 2018

(87) PCT Pub. No.: WO2017/022646
PCT Pub. Date: Feb. 9, 2017

(65) Prior Publication Data
US 2018/0220332 A1 Aug. 2, 2018

(30) Foreign Application Priority Data
Aug. 5, 2015 (JP) .............................. JP2015-155289

(51) Int. Cl.
*H04W 28/10* (2009.01)
*H04W 68/00* (2009.01)
(Continued)

(52) U.S. Cl.
CPC ............. *H04W 28/10* (2013.01); *H04W 4/14* (2013.01); *H04W 68/00* (2013.01); *H04W 88/18* (2013.01); *H04W 4/70* (2018.02); *H04W 28/0215* (2013.01)

(58) Field of Classification Search
CPC ....... H04W 28/10; H04W 4/14; H04W 68/00; H04W 88/18; H04W 4/70; H04W 28/0215
See application file for complete search history.

(56) References Cited

U.S. PATENT DOCUMENTS

2007/0171450 A1* 7/2007 Yoshida ................ G06F 3/0485
358/1.13
2013/0115993 A1* 5/2013 Jain ........................ H04W 76/10
455/517

(Continued)

FOREIGN PATENT DOCUMENTS

JP 2009-534001 A 9/2009

OTHER PUBLICATIONS

"3rd Generation Partnership Project; Technical Specification Group Services and System Aspects; System Improvements for Machine-Type Communications (MTC), (Release1 1)", 3GPP TR 23.888, V11.0.0, Sep. 2012, 165 pages.

(Continued)

*Primary Examiner* — Harry H Kim

(57) ABSTRACT

The present invention addresses the problems of reduction of an operation guaranteed period and an operation failure of an entire system caused by the reduction of the operation guaranteed period or an operation stop of a specific device. The present invention includes a control unit that controls transmission of a triggering message to a terminal based on at least one of an identifier included in the triggering message for triggering the terminal and used to identify the (Continued)

terminal, and an identifier for identifying a group to which the terminal belongs.

3 Claims, 4 Drawing Sheets

(51) Int. Cl.
*H04W 4/14* (2009.01)
*H04W 88/18* (2009.01)
*H04W 4/70* (2018.01)
*H04W 28/02* (2009.01)

(56) References Cited

U.S. PATENT DOCUMENTS

| | | | | |
|---|---|---|---|---|
| 2013/0265953 | A1* | 10/2013 | Salkintzis | H04W 60/04 370/329 |
| 2014/0357262 | A1 | 12/2014 | Zhang et al. | |
| 2015/0118954 | A1* | 4/2015 | Sundstedt | H04W 4/70 455/9 |
| 2015/0341957 | A1* | 11/2015 | Tang | H04W 72/1289 370/329 |
| 2016/0142477 | A1* | 5/2016 | Kawazoe | H04L 67/1004 709/203 |
| 2016/0150349 | A1* | 5/2016 | Li | H04W 4/06 370/329 |
| 2016/0316375 | A1* | 10/2016 | Li | H04W 72/1226 |
| 2016/0337245 | A1* | 11/2016 | Yamada | H04L 41/0813 |
| 2017/0085570 | A1* | 3/2017 | Zhang | H04L 67/10 |
| 2018/0049205 | A1* | 2/2018 | Oyama | H04W 72/0453 |

OTHER PUBLICATIONS

"3rd Generation Partnership Project; Technical Specification Group Services and System Aspects; Architecture Enhancements to facilitate communications with Packet Data Networks and Applications (Release 13)", 3GPP TS 23.682, V13.2.0, Jun. 2015, 70 pages.

"Triggering message filtering in SMS router", ZTE Corporation, 3GPP TSG SA WG3 (Security) Meeting #74, S3-140090, Jan. 20-24, 2014, 4 pages.

Tadashi Kiuchi et al., "A Design of History Based Packet Filtering with Probabilistic Packet Marking", IPSJ SIG Technical Report, Apr. 15, 2010, pp. 1-7, vol. 2010-CSEC-48, No. 14.

International Search Report for PCT/JP2016/072236 dated Aug. 30, 2016.

* cited by examiner

COMMUNICATION SYSTEM, COMMUNICATION CONTROL APPARATUS, COMMUNICATION CONTROL METHOD, AND COMMUNICATION PROGRAM

CROSS REFERENCE TO RELATED APPLICATIONS

This application is a National Stage of International Application No. PCT/JP2016/072236 filed Jul. 28, 2016, claiming priority based on Japanese Patent Application No. 2015-155289 filed Aug. 5, 2015, the contents of all of which are incorporated herein by reference in their entirety.

TECHNICAL FIELD

The present invention relates to a communication system, a communication control apparatus, a communication control method and a communication program.

BACKGROUND ART

Currently, for example, a cellular communication function is not only widely used for voice communication and data communication of mobile telephones and smartphones, but is also widely used by devices for machine type communication (also referred to as MTC devices). The number of communication terminals (referred to as UEs (User Equipment) or communication terminals below) including the MTC devices is increasing.

Users and applications (referred to as application servers below) operated by the users need both a communication method which performs activation from a MTC device side, and a communication method which activates the MTC device from a network side. The communication method which activates the MTC device from the network side includes triggering. This triggering is performed to activate a MTC device from the MTC application server via a network and establish communication connection.

Non-Patent Literature 1 proposes a plurality of methods for triggering a UE (MTC device). One of the plurality of methods is a method for triggering a UE (MTC device) from an external application server (AS) via a network node such as a MTC server (SCS: Service Capability Server) or a MTC-IWF (MTC-Interworking Function).

Non-Patent Literature 2 proposes a mechanism which monitors a quantity or a rate of triggering requested from a MTC server to a MTC-IWF and, when a total rate of trigger request from all SCSs, the total rate being in specific MTC server or specific MTC-IWF, exceeds a threshold, stops a triggering procedure, or suppresses triggering of a specific type to avoid situations of network congestion caused by very frequently executing triggering and an increase in battery consumption of the MTC device.

More specifically, the application server (AS) requests transmission of a device trigger request (also referred to as a trigger request below) to a MTC server (SCS: Service Capability Server), and the MTC server having received this request transmits the device trigger request to a MTC-IWF (Interworking Function which is also referred to as the IWF below).

The MTC-IWF, having received the device trigger request, executes a necessary check, and performs processing for transmitting the device trigger to a UE. As the device trigger, various types of messages such as a control message (NAS (Network Access Stratum) message) and a SMS (short message), a CBS (Cell Broadcast Service), a MBMS (Multimedia Broadcast and Multicast Service) and data packets (IP packets) transmitted from an entity to a UE in a cellular network can be used.

In addition, the necessary check performed by the MTC-IWF is authorization of a transmission source MTC server. Further, the MTC-IWF checks load control of the trigger request received from the MTC server (whether or not a transmission count (submission quota) does not exceed a predetermined value, whether or not a transmission frequency (submission rate) of the trigger request does not exceed a predetermined value and whether or not a processing load of the MTC-IWF is an overload). When the transmission frequency of the trigger request exceeds the predetermined value, the MTC-IWF transmits to the MTC server a device trigger response (or a device trigger confirmation message which is referred to as a trigger response below) including a value (cause value) indicating that the device trigger cannot be transmitted due to a load control problem (reason of failure). Meanwhile, when no problem is found during the check, an inquiry is sent to a HLR/HSS (Home Location Register/Home Subscription Server which is a HSS) to obtain subscription information (subscriber information which is referred to as UE information below) for UE included in a response, and confirm contents of the subscription information as to whether or not the response indicates an error.

CITATION LIST

Non Patent Literature

NPL 1: "3rd Generation Partnership Project; Technical Specification Group Services and System Aspects; System Improvements for Machine-Type Communications", 3GPP TR 23.888.

NPL 2: "3rd Generation Partnership Project; Technical Specification Group Services and System Aspects; Architecture Enhancements to facilitate communications with Packet Data Networks and Applications", 3GPP TS 23.682.

SUMMARY OF INVENTION

Technical Problem

The above-described related art makes a decision based on the quantity or the rate of triggering in the MTC-IWF, and can avoid the situations of network congestion caused by very frequently executing triggering in the entire network or an increase in battery consumption of a UE (MTC device). However, the related art does not consider a case where a specific UE (MTC device) is very frequently triggered. Hence, for example, a specific UE (MTC device) is very frequently triggered intentionally or due to some failure and the increase in a battery consumption amount of the UE (MTC device) reduces an operation guaranteed period or stops an operation of this UE. Therefore, it is not possible to suppress the problems of reduction of the operation guaranteed period in the entire system, and a malfunction and an operation stop of the system. That is, there is no technique for monitoring triggering of the specific UE (MTC device) to maintain the operation guaranteed period of the system and suppress such problems as the malfunction and the operation stop of the system.

It is therefore an object of the present invention to provide a communication system, a communication apparatus and a communication method which solve the above problems.

Solution to Problem

To solve the above problems, one aspect of the present invention includes a control unit that controls transmission of a triggering message to a terminal based on at least one of an identifier included in the triggering message for triggering the terminal and used to identify the terminal, and an identifier for identifying a group to which the terminal belongs.

To solve the above problems, one aspect of the present invention includes a control unit that controls transmission of a triggering message to a terminal based on at least one of an identifier included in the triggering message for triggering the terminal and used to identify the terminal, and an identifier for identifying a group to which the terminal belongs.

To solve the above problems, one aspect of the present invention includes controlling transmission of a triggering message to a terminal based on at least one of an identifier included in the triggering message for triggering the terminal and used to identify the terminal, and an identifier for identifying a group to which the terminal belongs.

Advantageous Effects of Invention

According to the present invention, it is possible to support problems of reduction of an operation guaranteed period and an operation failure of an entire system caused by the reduction of the operation guaranteed period or an operation stop of a specific device.

DESCRIPTION OF EMBODIMENTS

Figure 1:
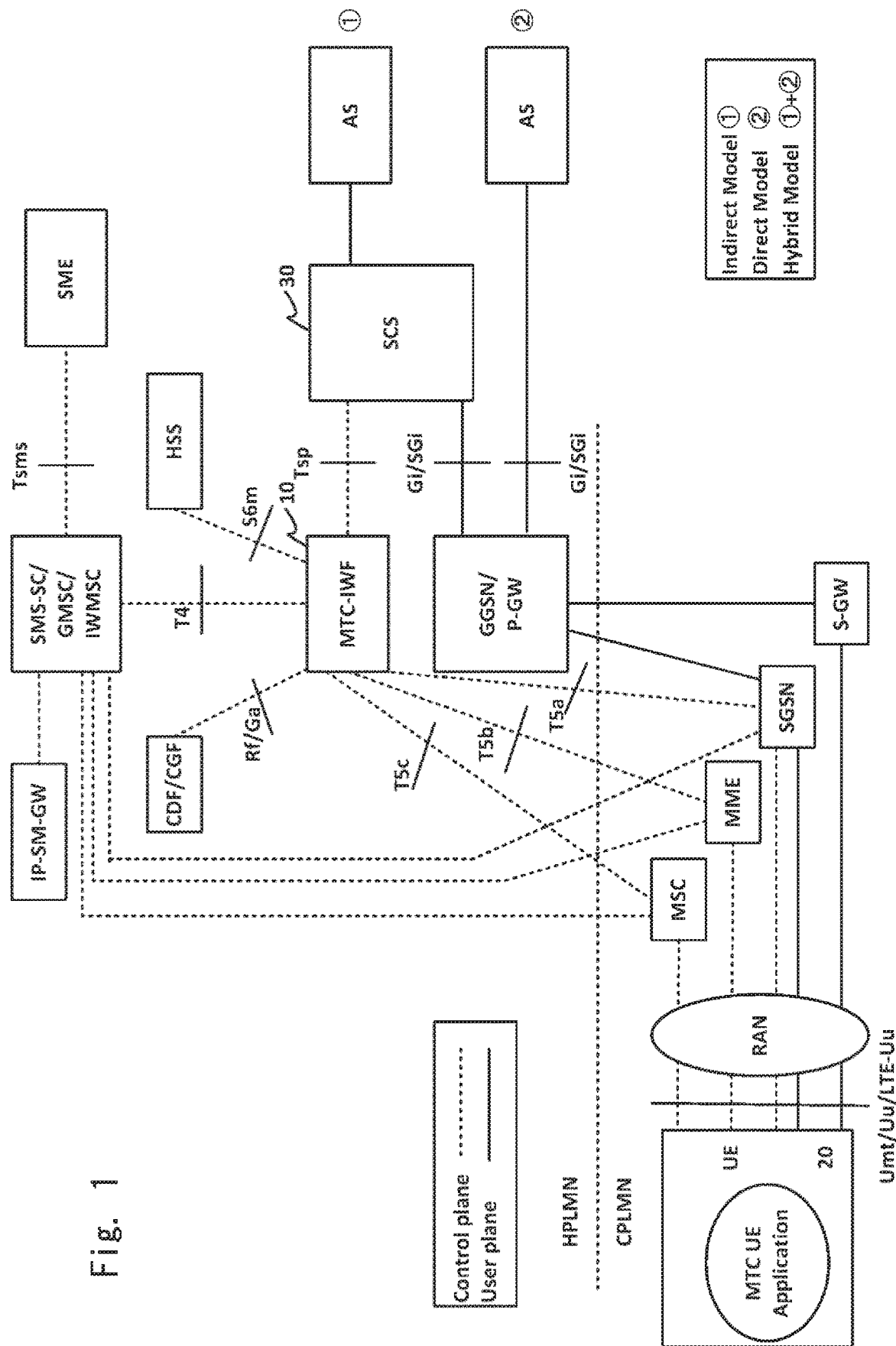
FIG. 1 is a schematic diagram of a network system according to the present invention.

As illustrated in FIG. 1, in a network system according to the present invention, a control device of a network node (MTC-IWF: Inter-Working Function) 10 includes a monitoring unit 11 and a control unit 12. The monitoring unit 11 monitors an identifier which is included in a triggering message for triggering a UE 20 (User Equipment) and is used to identify the UE 20. Further, the control unit 12 controls transmission of the triggering message to the UE 20 according to a monitoring result of the monitoring unit 11. The network system according to the present invention described herein includes LTE/SAE/EPS (Long Term Evolution/System Architecture Evolution/Evolved Packet System), UMTS, GPRS (General Packet Radio Service) and GSM (Global System FOR Mobile Communications) (registered trademark).

Next, the network system provided with the network node 10 and the UE 20 will be described. The following description is an example of a M2M core network of LTE and will describe a network node as a MTC-IWF (Inter-Working Function) and a UE as a MTC device. However, names of various entities comply with a specification of each network.

As illustrated in FIG. 1, the network system according to the present invention includes the MTC-IWF 10. The MTC-IWF 10 functions as a node which relays a message between the MTC device 20 and a SCS (Service Capability Server) 30. In addition, the SCS 30 functions as a MTC server in the M2M core network of LTE. Further, the MTC-IWF 10 will be used and described as the network node as described above. Other nodes may be a HSS (Home Subscriber Server), a MME (Mobility Management Entity), a SGSN (Serving GPRS (General Packet Radio Service) Support Node) and a MSC (Mobile Switching Centre). Furthermore, in the following description, the MME, the SGSN and the MSC will be referred to as a "MME/SGSN/MSC" and will be collectively denoted by reference numeral 40. The MTC device 20 and the MTC-IWF 10 perform communication via the MME/SGSN/MSC 40 and a RAN (Radio Access Network).

The present invention will be described in detail below.

First Exemplary Embodiment 1

The first exemplary embodiment 1 of the present invention will be described.

Figure 2:
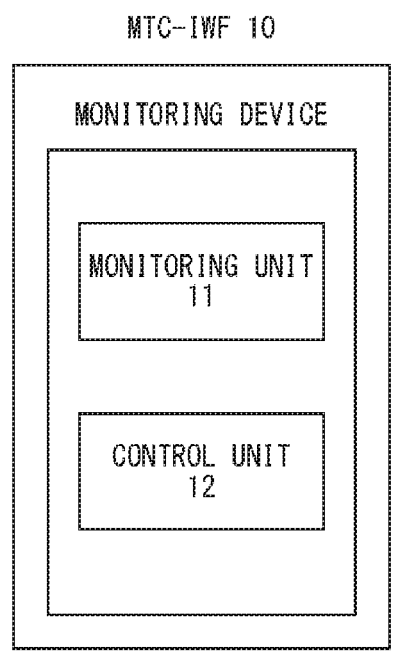
FIG. 2 is a block diagram for explaining a network node according to the present invention.

A MTC-IWF 10 according to the present embodiment includes a monitoring unit 11 and a control unit 12 as illustrated in FIG. 2.

The monitoring unit 11 holds a history of triggering messages from a SCS 30. This triggering message is transmitted by using various types of messages such as a control message (NAS (Network Access Stratum) message) and a SMS (short message), a CBS (Cell Broadcast Service), a MBMS (Multimedia Broadcast and Multicast Service) and data packets (IP packets) transmitted from an entity in a cellular network to a MTC device 20. In the present invention any type of message may be used.

When the monitoring unit 11 receives a triggering message, the monitoring unit 11 stores the received triggering message as a history.

Meanwhile, the monitoring unit 11 confirms identification information of a MTC device described in an external identifier or a MSISDN (Mobile Subscriber Integrated Services Digital Network Number) included in the received triggering message, monitors an occurrence situation such as an occurrence count or an occurrence frequency of triggering per MTC device, and, when the triggering is performed very frequently, decides that an abnormality is caused intentionally or due to some failure.

The control unit 12 controls transfer of the triggering message to the MTC device 20 according to the monitoring result of the monitoring unit 11. Control of the triggering message performed by the control unit 12 indicates discarding or buffering of the triggering message. Based on, for example, a priority described in the triggering message or a priority described in the triggering message and set per application, a triggering message of a low priority is discarded or buffered. In this regard, 3GPP TR 23.887 defines a plurality of triggering message control methods. These control methods may be applied to the present invention.

Figure 3:
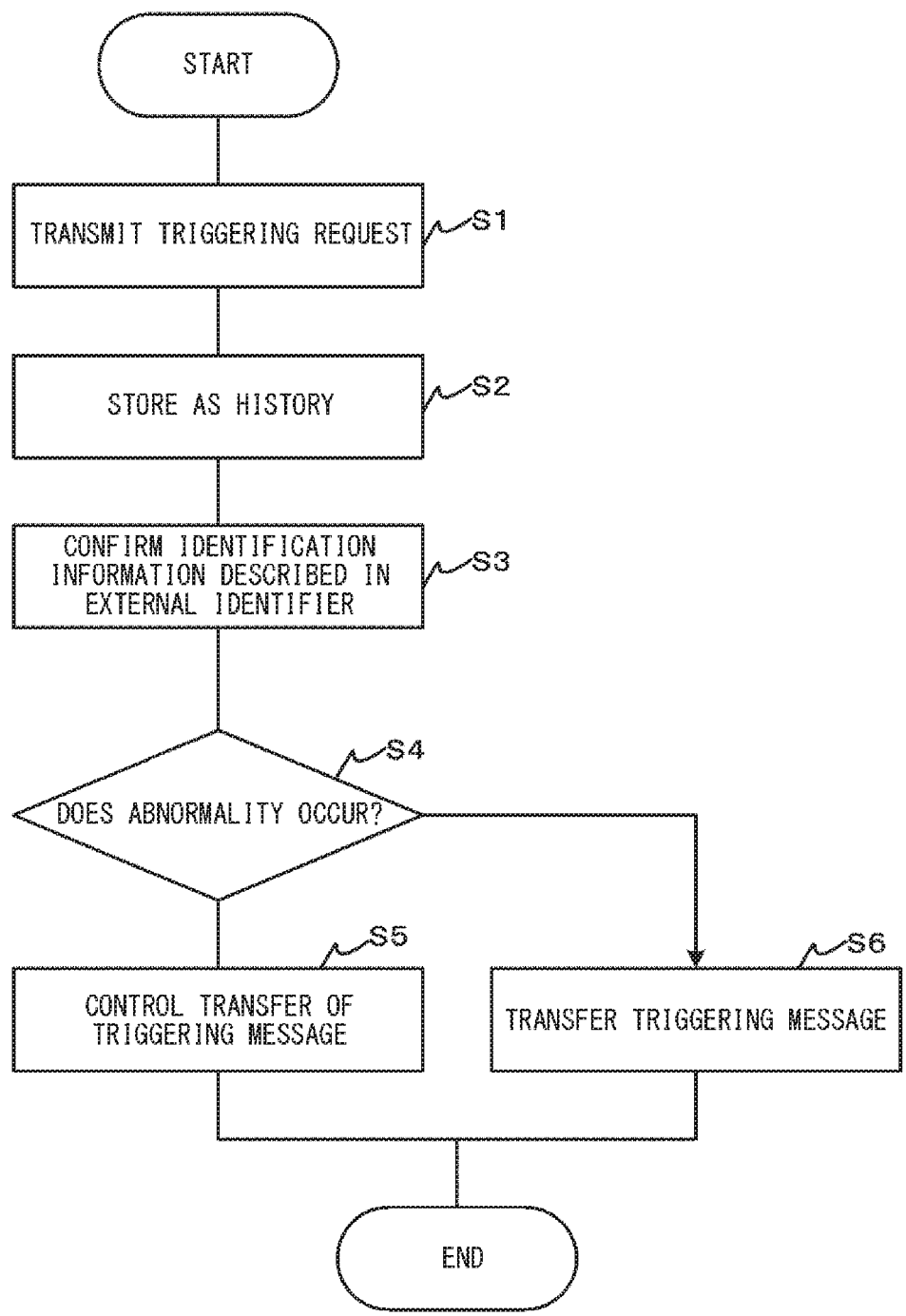
FIG. 3 is a view for explaining an operation of the present invention.

Next, an operation according to the present embodiment will be described with reference to FIG. 3.

When the SCS 30 receives the triggering request message from an AS, the SCS 30 transmits a triggering request to the MTC-IWF (step S1).

When the monitoring unit 11 receives the triggering request from the SCS, the monitoring unit 11 confirms whether or not the SCS is permitted to transmit the triggering request, and handles the triggering request as the triggering message and holds the triggering message as a history when the SCS is permitted to transmit the triggering request (step S2).

The monitoring unit 11 confirms identification information of a MTC device described in an external identifier (step S3).

The monitoring unit 11 monitors a triggering reception frequency (occurrence situation) in a predetermined period with respect to the MTC device indicated by the identification information, based on the confirmed identification information, and decides whether or not an abnormality occurs (step S4).

When the abnormality occurs in S4, the control unit 12 controls the transfer of the triggering message according to the monitoring result of the monitoring unit 11 (step S5). On the other hand, when the abnormality does not occur in S4, the control unit 12 transfers the triggering message as is (step S6).

In addition, in the above embodiment, the MTC-IWF 10 includes the monitoring unit 11 and decides whether or not an abnormality occurs, but the monitoring unit 11 may be included in a new component which adds on to the MTC-IWF 10.

Further, the above embodiment has been described by using a configuration of monitoring triggering of a specific MTC device. However, there may be a configuration of grouping MTC devices, and monitoring triggering based on identification information for identifying each group of the grouped MTC devices. In this case, there may be a configuration of using identification information of a device group defined in the MTC device, using attribute information grouped based on a type and an installation place of the MTC device, and holding a correspondence table between identification information of MTC devices and groups and using this correspondence table to monitor triggering of a specific MTC device.

In a case of such a configuration, it is possible to detect and support abnormal triggering of a specific area (a room or a building). Further, it is also possible to detect and support abnormal triggering of an important device group (devices which collect critical information). Furthermore, by applying this configuration only to battery driven devices, it is also possible to support discarding of unnecessary triggering. Still further, it is possible to apply this configuration to a device having device vulnerability (old devices or devices which are previously installed and cannot be updated), and support discarding of unnecessary triggering.

According to the present invention, it is possible to support problems of reduction of an operation guaranteed period and an operation failure of an entire system caused by reduction of the operation guaranteed period and an operation stop of a specific device.

EXAMPLE

The above monitoring unit 11 according to the present invention monitors a triggering frequency per MTC device and decides whether or not an abnormality occurs. The following examples will describe this deciding method in detail.

Example 1

The monitoring unit 11 counts a reception count per predetermined time (Δt) based on the history of the triggering messages stored per MTC device 20 by the MTC-IWF 10, and holds a maximum value among reception counts as a reception frequency maximum value (Tri_max). In addition, the monitoring unit 11 may update the reception frequency maximum value (Tri_max) per predetermined time or based on a triggering operation such transmission or reception of the triggering message.

Further, when receiving the triggering message, the monitoring unit 11 compares a value (Tri_max×A) obtained by weighting the reception frequency maximum value (Tri_max) of the MTC device 20 described in the external identifier, and a reception count (Tri_num) at the predetermined time (Δt) including a current reception time of the triggering message. As a result of comparison, in a case of (Tri_num)>(Tri_max×A), the monitoring unit 11 decides that the abnormality occurs, and discards the triggering message to stop transferring the triggering message or buffers the triggering message for the predetermined time to delay.

In addition, the comparison which uses the reception frequency maximum value has been described. However, a numerical value obtained by weighting an average of higher past reception frequencies or a standard deviation of the past reception frequencies may be used.

Example 2

The monitoring unit 11 counts the reception count per predetermined time (Δt) based on the history of the triggering messages stored per MTC device 20 by the MTC-IWF 10, and calculates and holds an average value (Tri_ave) of the reception counts. In addition, similar to modified example 1, the monitoring unit 11 may update the average value (Tri_ave) per predetermined time or based on a triggering operation such as transmission or reception of the triggering message.

Further, when receiving the triggering message, the monitoring unit 11 compares a value (Tri_ave×B) obtained by weighting the average value (Tri_ave) of the MTC device 20 described in an external identifier, and the reception count (Tri_num) at the predetermined time (Δt) including a current reception time of the triggering message. As a result of comparison, in a case of (Tri_num)>(Tri_ave×B), the monitoring unit 11 decides that the abnormality occurs, and discards the triggering message to stop transferring the triggering message or buffers the triggering message for a predetermined time to delay.

In addition, the comparison which uses the average value has been described above. An arithmetic mean or a median may be used.

Example 3

The monitoring unit 11 subdivides one day and sets a plurality of time zones based on the history of the triggering messages stored per MTC device 20 by the MTC-IWF 10, counts a reception count of each time zone, and calculates a value (Time_Weight_hour: Time_Weight_0, Time_Weight_1, . . . , and Time_Weight_23) obtained by normalizing the occurrence frequency of each time zone. Further, the monitoring unit 11 uses this calculated value (Time_Weight_hour: Time_Weight_0, Time_Weight_1, . . . , and Time_Weight_23) to correct the average value (Tri_ave) calculated in above modified example 2 and calculate and hold a threshold (Tri_thre=Time_Weight_hour×Tri_ave) of each time zone. In addition, similar to modified example 1, the monitoring unit 11 may update the threshold (Tri_thre)

of each time zone per predetermined time or based on a triggering operation such as transmission or reception of a triggering message.

Further, when receiving the triggering message, the monitoring unit 11 searches the threshold (Tri_thre) of a time zone corresponding to a reception time of this triggering message from the thresholds of the MTC device 20 described in the external identifier. The monitoring unit 11 compares a value (Tri_thre×C) obtained by weighting this searched threshold, and the reception count (Tri_num) at the predetermined time ($\Delta t$) including the current reception time of the triggering message. As a result of comparison, in a case of (Tri_num)>(Tri_thre×C), the monitoring unit 11 decides that an abnormality occurs, and discards the triggering message to stop transferring the triggering message or buffers the triggering message for a predetermined time to delay.

In this regard, the comparison which uses the value (Time_Weight_hour) obtained by normalizing an occurrence frequency per time zone has been described. One day may be subdivided per time such as morning and afternoon. Further, a method for creating the threshold by using the average value described in modified example 2 is explained. However, the threshold may be created by using a maximum value in a past identical time zone.

In addition, the examples have been described by using a plurality of deciding methods. However, for example, there may be another method where an administrator sets a threshold in advance, and decides that an abnormality occurs when the threshold is exceeded.

Further, the above present invention can be also configured by hardware as is obvious from the above description. However, the present invention can be realized by causing an information processing apparatus (CPU) to perform each processing by a computer program. In this case, a processor which operates according to a program stored in a program memory realizes the same functions and operations as those in the above embodiment.

Figure 4:
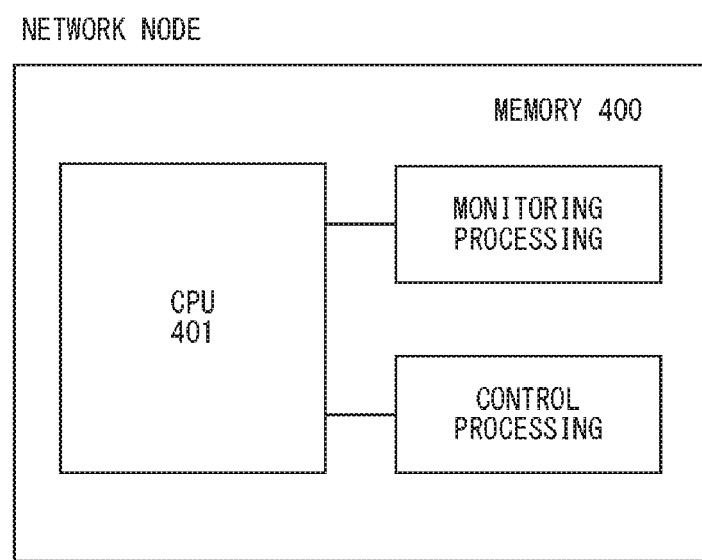
FIG. 4 is a view illustrating another aspect of the network node according to the present invention.

As illustrated in FIG. 4, for example, the network node 10 can be realized by a computer system composed of a memory 400 and a CPU 401. In this case, a program of performing processing corresponding to the above monitoring unit 11 and control unit 12 is stored in the memory 400. Further, the CPU 401 executes the program stored in the memory 400, so that the functions of the monitoring unit 11 and the control unit 12 are realized.

The present invention has been described above by describing the embodiment and the examples. However, the present invention is not necessarily limited to the above embodiment and the examples, and can be variously modified and carried out within the scope of the technical idea.

Part or all of the above embodiment may be described as in the following supplementary notes yet is not limited to the below.

(Supplementary Note 1)

A communication system includes a control unit that controls transmission of a triggering message to a terminal based on at least one of an identifier included in the triggering message for triggering the terminal and used to identify the terminal, and an identifier for identifying a group to which the terminal belongs.

(Supplementary Note 2)

In the communication system according to Supplementary Note 1, the control unit controls the transmission of the triggering message by deleting the triggering message or putting off the transmission of the triggering message.

(Supplementary Note 3)

In the communication system according to Supplementary Note 1 or 2, the control unit performs the control by using an occurrence frequency of a predetermined period including a reception time of a triggering message including a predetermined identifier, and a maximum value of an occurrence frequency of a past triggering message including the identifier.

(Supplementary Note 4)

In the communication system according to Supplementary Note 1 or 2, the control unit performs the control by using an occurrence frequency of a predetermined period including a reception time of a triggering message including a predetermined identifier, and an average value of occurrence frequencies of past triggering messages including the identifier.

(Supplementary Note 5)

In the communication system according to Supplementary Note 1 or 2, the control unit performs the control by using an occurrence frequency of a predetermined period including a reception time of a triggering message including a predetermined identifier, and an occurrence frequency in a time zone corresponding to the predetermined period and of a past triggering message including the identifier.

(Supplementary Note 6)

In the communication system according to any one of Supplementary Notes 1 to 5, the terminal is a machine type communication (MTC) terminal.

(Supplementary Note 7)

A control device includes a control unit that controls transmission of a triggering message to a terminal based on at least one of an identifier included in the triggering message for triggering the terminal and used to identify the terminal, and an identifier for identifying a group to which the terminal belongs.

(Supplementary Note 8)

In the control device according to Supplementary Note 7, the control unit controls the transmission of the triggering message by deleting the triggering message or putting off the transmission of the triggering message.

(Supplementary Note 9)

In the control device according to Supplementary Note 7 or 8, the control unit performs the control by using an occurrence frequency of a predetermined period including a reception time of a triggering message including a predetermined identifier, and a maximum value of an occurrence frequency of a past triggering message including the identifier.

(Supplementary Note 10)

In the control device according to Supplementary Note 7 or 8, the control unit performs the control by using an occurrence frequency of a predetermined period including a reception time of a triggering message including a predetermined identifier, and an average value of occurrence frequencies of past triggering messages including the identifier.

(Supplementary Note 11)

In the control device according to Supplementary Note 7 or 8, the control unit performs the control by using an occurrence frequency of a predetermined period including a reception time of a triggering message including a predetermined identifier, and an occurrence frequency in a time zone corresponding to the predetermined period and of a past triggering message including the identifier.

(Supplementary Note 12)

In the control device according to any one of Supplementary Notes 7 to 11, the terminal is a machine type communication (MTC) terminal.

(Supplementary Note 13)

A communication method includes controlling transmission of a triggering message to a terminal based on at least one of an identifier included in the triggering message for triggering the terminal and used to identify the terminal, and an identifier for identifying a group to which the terminal belongs.

(Supplementary Note 14)

According to the communication method according to Supplementary Note 13, the controlling controls the transmission of the triggering message by deleting or standing by for the triggering message.

(Supplementary Note 15)

According to the communication method according to Supplementary Note 13 or 14, the controlling is performed by using an occurrence frequency of a predetermined period including a reception time of a triggering message including a predetermined identifier, and a maximum value of an occurrence frequency of a past triggering message including the identifier.

(Supplementary Note 16)

According to the communication method according to Supplementary Note 13 or 14, the controlling is performed by using an occurrence frequency of a predetermined period including a reception time of a triggering message including a predetermined identifier, and an average value of occurrence frequencies of past triggering messages including the identifier.

(Supplementary Note 17)

According to the communication method according to Supplementary Note 13 or 14, the controlling is performed by using an occurrence frequency of a predetermined period including a reception time of a triggering message including a predetermined identifier, and an occurrence frequency in a time zone corresponding to the predetermined period and of a past triggering message including the identifier.

(Supplementary Note 18)

According to the communication method according to any one of Supplementary Notes 13 to 17, the terminal is a machine type communication (MTC) terminal.

(Supplementary Note 19)

A program of a control device causes the control device to function as a control unit that controls transmission of a triggering message to a terminal based on at least one of an identifier included in the triggering message for triggering the terminal and used to identify the terminal, and an identifier for identifying a group to which the terminal belongs.

(Supplementary Note 20)

According to the program according to Supplementary Note 19, the control unit controls the transmission of the triggering message by deleting the triggering message or putting off the transmission of the triggering message.

(Supplementary Note 21)

According to the program according to Supplementary Note 19 or 20, the control unit performs the control by using an occurrence frequency of a predetermined period including a reception time of a triggering message including a predetermined identifier, and a maximum value of an occurrence frequency of a past triggering message including the identifier.

(Supplementary Note 22)

According to the program according to Supplementary Note 19 or 20, the control unit performs the control by using an occurrence frequency of a predetermined period including a reception time of a triggering message including a predetermined identifier, and an average value of occurrence frequencies of past triggering messages including the identifier.

(Supplementary Note 23)

According to the program according to Supplementary Note 19 or 20, the control unit performs the control by using an occurrence frequency of a predetermined period including a reception time of a triggering message including a predetermined identifier, and an occurrence frequency in a time zone corresponding to the predetermined period and of a past triggering message including the identifier.

(Supplementary Note 24)

According to the program according to any one of Supplementary Notes 19 to 23, the terminal is a machine type communication (MTC) terminal.

This application is based upon and claims the benefit of priority from Japanese patent application No. 2015-155289 filed on Aug. 5, 2015, the disclosure of which is incorporated herein in its entirety by reference.

REFERENCE SIGNS LIST

10 MTC-IWF
20 MTC device
30 SCS
11 Monitoring unit
12 Control unit
400 Memory
401 CPU

The invention claimed is:

1. A communication system comprising a control unit that controls transmission of a triggering message to a terminal based on an identifier included in the triggering message for triggering the terminal, the identifier identifying a group to which the terminal belongs, the group being determined according to whether the terminal is a battery driven device or a device having device, vulnerability, wherein the control unit performs the control when an occurrence frequency of a predetermined period including a reception time of the triggering message including the identifier is larger than a value obtained by weighting a threshold of a time zone corresponding to the predetermined period, wherein the control unit controls the transmission of the triggering message by deleting the triggering message or putting off the transmission of the triggering message, and wherein the terminal is a machine type communication (MTC) terminal.

2. A control device comprising:

hardware, including a processor and a memory; and a control unit that is implemented at least by the hardware and that controls transmission of a triggering message to a terminal based on an identifier included in the triggering message for triggering the terminal, the identifier identifying a group to which the terminal belongs, the group being determined according to whether the terminal is a battery driven device or a device having device, vulnerability, wherein the control unit performs the control when an occurrence frequency of a predetermined period including a reception time of the triggering message including the identifier is larger than a value obtained by weighting a threshold of a time zone corresponding to the predetermined period, wherein the control unit controls the transmission of the triggering message by deleting the triggering message or putting off the transmission of the triggering message, and wherein the terminal is a machine type communication (MTC) terminal.

3. A communication method comprising controlling transmission of a triggering message to a terminal based on an identifier included in the triggering message for triggering the terminal, the identifier identifying a group to which the terminal belongs, the group being determined according to whether the terminal is a battery driven device or a device having device vulnerability, wherein the controlling is performed when an occurrence frequency of a predetermined period including a reception time of the triggering message including the identifier is larger than a value obtained by weighting a threshold of a time zone corresponding to the predetermined period, wherein the controlling controls the transmission of the triggering message by deleting or standing by for the triggering message, and wherein the terminal is a machine type communication (MTC) terminal.

* * * * *